United States Patent Office 2,727,973
Patented Dec. 20, 1955

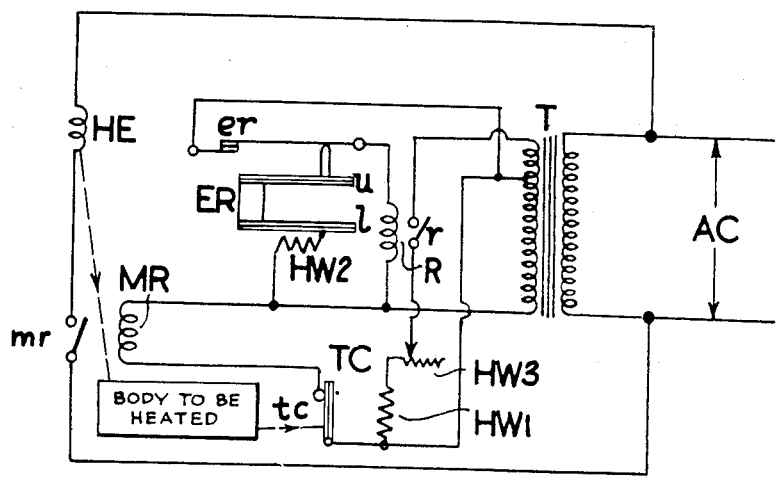

2,727,973
TEMPERATURE CONTROLLERS

George Thomas Collins, Streetly, near Sutton Coldfield, England, assignor to British Industrial Plastics Limited, London, England, a company of Great Britain Application September 11, 1951, Serial No. 246,108

Claims priority, application Great Britain September 27, 1950

6 Claims. (Cl. 219—20)

This invention relates to temperature controllers.

It provides a controller for maintaining the temperature of a body, to which heat is to be applied, at a substantially constant value by the supply of heat energy in pulses at a rate which is proportional to the rate at which said body looses heat energy, rather than by the fall of temperature of said body below and rise of temperature above predetermined lower and upper limits respectively.

According to the invention, a temperature controller for maintaining at a substantially constant value the temperature of a body to which heat energy is applied includes means for applying heat to said body, a thermally controlled means for interrupting the application of heat energy to said body said means being adapted to operate partly under control of heat absorbed from said body and partly under control of pulses of heat energy applied to it, and an energy regulator for controlling the pulsed heat energy applied per unit of time to said thermally controlled means.

Preferably the heat energy is applied to said body and the pulses of heat energy are applied to said means for supplying heat to said body by electrical heating means. The electrical heating means may be energized by direct current or by low or high frequency alternating current.

Preferably also, the energy regulator may be electrically controlled in such manner as to apply pulses of heat to said thermally controlled means at a substantially constant repetition frequency providing the supply voltage is constant and automatically to compensate for variations in the supply voltage by varying the duration of said pulses.

This invention is illustrated in the accompanying drawing which shows it applied to a low (mains) frequency electrically heated system.

In the drawing HE represents an electrical heating element for applying heat energy to the body (not shown) which is required to be heated. It is connected, in series with the normally open contacts mr of a mercury relay, across the mains of a low frequency, e. g. public supply, source of alternating electrical energy A. C.

The operating winding MR of the mercury relay is connected in series with the normally closed contacts tc of a thermal control element TC, across part of the secondary winding of a transformer T, whose primary winding is connected to A. C. The thermal control element TC consists of a bimetallic strip in heat-exchanging relationship with the body whose temperature is to be maintained constant. It is provided with a heater winding HW1 which, under the conditions of operation, is unable to supply sufficient heat energy to the bimetallic strip to cause it to open the contacts tc of the thermal control element.

The heater winding HW1 of the thermal control element is connected in series with a preset resistor HW3, and the normally open contacts r of a relay R, across a part of the secondary winding of transformer T. The winding of relay R is connected in series with the normally closed contacts of an energy regulator ER, across a part of the secondary winding of transformer T.

The energy regulator, which is in itself a known device, consists of an upper bimetallic strip u and a lower bimetallic strip 1. The upper bimetallic strip u serves to maintain the operation of the energy regulator constant in spite of variations of ambient temperature. The lower bimetallic strip 1 is provided with a heater winding HW2.

Heater winding HW2 is connected, in series with the energy regulator and its contacts er, across part of the secondary winding of transformer T. The energy regulator ER thus operates as a temperature compensated self interrupter, and operates at a substantially constant frequency. It is provided with means for adjusting the ratio of make to break of its contacts er.

The preset resistor HW3 is used to set the temperature range over which the temperature controller will operate.

In operation, when alternating current is switched on to transformer T, the mercury relay MR operates to close its contacts mr, and thus to apply heat energy, through the agency of HE, to the body to be heated, relay R operates to close its contact r, and the energy regulator ER starts to operate eventually to interrupt at contacts er both its own heating circuit through HW2 and the circuit through the winding of relay R. Relay R when it releases interrupts the heating circuit for thermal control element TC. The pulses of heat energy applied to the bimetallic strip of the thermal control element TC by the heater winding HW1 are insufficient, of themselves, to cause TC to open its contacts tc. However, the bimetallic strip of thermal control element TC absorbs heat from the body being heated and at a critical temperature of the latter, the next pulse of heat energy is sufficient to cause tc to open, thus to break the circuit of the winding MR of the mercury relay. This relay releases and breaks the circuit through heating element HE.

The contacts tc only open for a very short time at the end of the pulse of heat energy, then close almost immediately the pulse is ended. The temperature of the body to be heated continues to rise but at a progressively slower rate, each successive impulse of heat energy to the heater winding HW1 causing the contacts tc to remain open for a longer time. This continues until the temperature ceases to rise and conditions are stable. The duration of time that contacts tc are held open depends in part on the rate at which the body to be heated looses heat energy. Similarly, the duration of time that they are held closed depends on the rate at which the body absorbs heat energy. The stable conditions of the temperature controller is with contacts mr periodically opening and closing so that heat energy is supplied in pulses to the body whose temperature is to be maintained constant at a rate which is proportional to the rate at which said body looses heat energy.

Clearly, heat energy may be supplied to the body to be heated by a high frequency electro-magnetic field, or by other means capable of control by the device of the invention.

While I have described my invention in one of its preferred embodiments I realize that modifications may be made and I desire that it be understood that no limitations upon my invention are intended other than may be imposed by the scope of the appended claims.

I claim:

1. A temperature controller for maintaining at a substantially constant value the temperature of a body to be heated, a power source comprising in combination with a body to be heated, a circuit including an electrical heating means in heat transferring relationship with said body for supplying heat thereto current controlling contacts in series with said electrical heating means, an electrical winding for controlling said contacts and an interrupter electrically connected in series between said power source and said electrical winding for interrupting the circuit to said electrical heating means through said contacts so as to periodically withhold heat from said body, said interrupter including a heat-responsive device, a heating coil for the heat responsive device, a pulsing device for supplying pulses of electrical energy of a predetermined constant frequency to the heating coil, the operation of the pulsing device being independent of the temperature of the said body and the pulsing device serving partly to operate said interrupter at the said predetermined frequency but to an insufficient extent to interrupt the application of heat to said body, the heat responsive device being situated in heat exchanging relationship with the body so as to absorb heat therefrom whereby to complete the operation of the interrupter at the predetermined frequency upon a predetermined temperature of the body being reached and to vary the on/off ratio of interruption in dependence upon the rate of change of temperature of the body.

2. A temperature controller for maintaining at a substantially constant value the temperature of a body to be heated as set forth in claim 19 in which said power source is constituted by low frequency alternating current, connections connecting the circuit of said electrical heating means to the said source of low frequency alternating current, and a transformer interposed between said source and said interrupter and said pulsing device.

3. A temperature controller for maintaining at a substantially constant value the temperature of a body to be heated, a power source comprising in combination with a body to be heated electrical heating means in heat transferring relationship with said body for supplying heat thereto and an interrupter for interrupting the circuit of said electrical heating means with respect to said power source so as to periodically withhold heat from said body, the interrupter including a heat responsive device, a first heating coil for the heat responsive device, a pulsing device comprising a first bimetallic strip, a second heating coil for said first bimetallic strip and contacts controlled by said first bimetallic strip and connected in circuit with said second heating coil for interrupting the circuit of said second heating coil and for supplying pulses of electrical energy of a predetermined frequency to said first heating coil, the operation of the pulsing device being independent of the temperature of the body and the pulsing device serving partly to operate the interrupter at the predetermined frequency but to an insufficient extent to interrupt the application of heat to the body, the heat responsive device comprising a second bimetallic strip disposed in heat exchanging relationship with said body so as to absorb heat therefrom whereby to complete operation of said interrupter at said predetermined frequency upon a predetermined temperature of the body being reached and to vary the on/off ratio of interruption in dependence upon the rate of change of temperature of the body.

4. A temperature controller for maintaining at a substantially constant value the temperature of a body to be heated comprising in combination with a body to be heated, a power source, an electrical heating member, a contactor in series with said electrical heating member and said power source, a relay winding controlling said contactor, a thermal contact controlling element disposed in heat absorptive position with respect to said body to be heated, a heater winding associated with said thermal contact controlling element, said relay winding being disposed in a series path with said thermal contact controlling element, means for deriving potential from said power source for feeding said series path, said thermal contact controlling element being normally closed and operative to open for a short time interval as said thermal contact controlling element absorbs heat from said body at the end of each pulse of heat energy and to remain open longer as the temperature of the body rises and a thermally operated self interrupter disposed between said source and said heater winding for controlling the frequency at which the heat pulses are supplied to said heater winding whereby the operation of said thermal contact controlling element is governed by the summation of heat supplied by said heater winding and by thermal absorption from the body being heated.

5. A temperature controller for maintaining at a substantially constant value the temperature of a body to be heated as set forth in claim 4 in which said power source is constituted by alternating current and in which a transformer having primary and secondary windings is provided with said primary winding connected with the power source and in series with said electrical heating member and the contactor and wherein said secondary winding is connected with said series path and with said self interrupter.

6. A temperature controller for maintaining at a substantially constant value the temperature of a body to be heated as set forth in claim 4 in which said self interrupter is constituted by a pair of coacting bimetallic strips, one of said strips controlling said interrupter at a constant rate independently of ambient temperature and the other of said strips having a heater winding associated therewith and disposed in circuit with said power source and operating to compensate said self interrupter in accordance with temperature.

References Cited in the file of this patent

UNITED STATES PATENTS

| 1,697,040 | Appelberg | Jan. 1, 1929 |
| 1,700,661 | Appelberg | Jan. 29, 1929 |
| 1,718,748 | Marshall | June 25, 1929 |
| 2,220,061 | Brown | Nov. 5, 1940 |
| 2,363,169 | Fischer | Nov. 21, 1944 |
| 2,510,038 | Rudahl | May 30, 1950 |
| 2,510,039 | Rudahl | May 30, 1950 |
| 2,510,040 | Rudahl | May 30, 1950 |